Feb. 8, 1949. J. R. DONALDSON 2,461,041
PLUG VALVE
Filed March 8, 1945
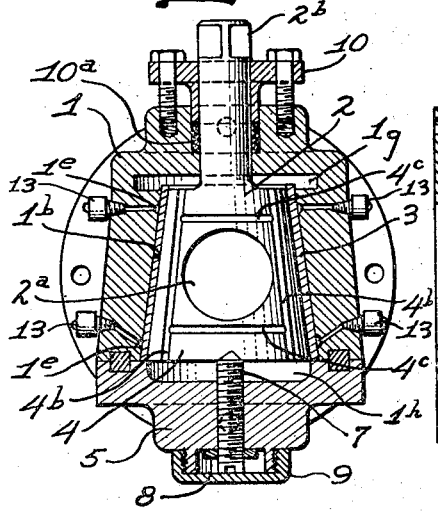
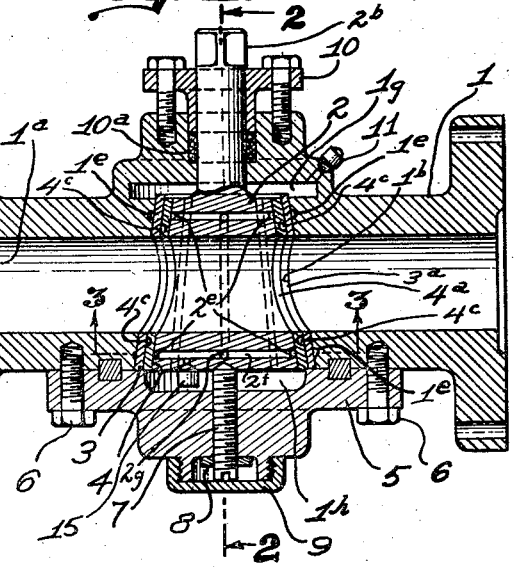
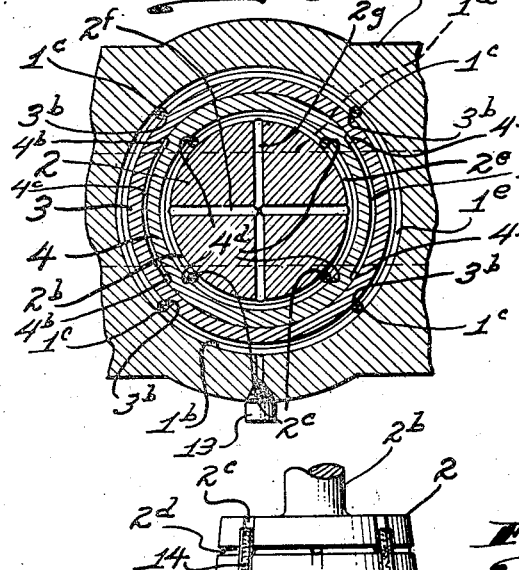
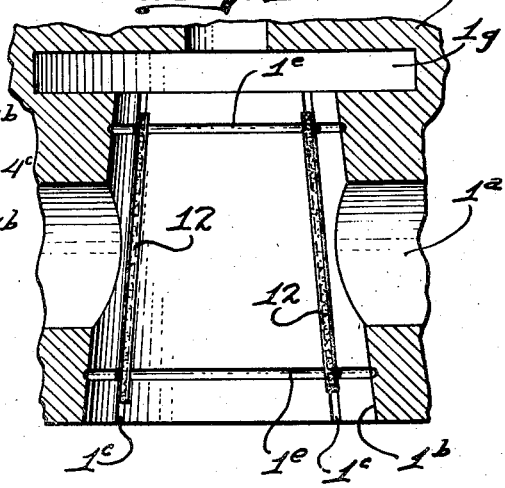
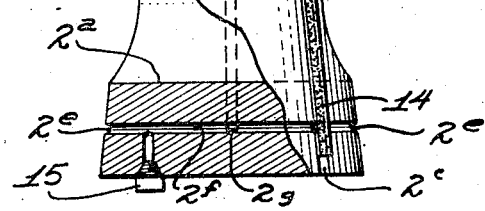
INVENTOR.
J. R. DONALDSON
BY
William B. Hall
ATTORNEY

UNITED STATES PATENT OFFICE 2,461,041

PLUG VALVE

John R. Donaldson, Ventura, Calif.

Application March 8, 1945, Serial No. 581,578

8 Claims. (Cl. 251—93)

My invention relates to valves, and particularly to valves subjected to high pressure and temperatures, and used for conducting liquids containing more or less abrasive substances.

One of the principal objects of this invention is to provide a valve of this class which may be easily or quickly repaired or relined, and which may be repaired in this manner without disconnecting the same from the pipe line system in which it is installed.

Another important object of this invention is to provide a sleeve in connection with the body or plug, or both, to provide the seating surface for the valve, which sleeve or sleeves may be readily removed when worn and replaced by another or others.

A further important object of this invention is to provide simple, economical, and effective means for removing the sleeve from its secured position for replacing it with another.

With these and other objects in view, as will appear hereinafter, I have devised a plug valve of this class having certain novel features of construction, combination, and arrangement of parts and portions, as will be hereinafter described in detail and particularly set forth in the appended claims, reference being had to the accompanying drawings, and to the characters of reference thereon, which form a part of this application, in which:

Fig. 1 is a fragmentary longitudinal sectional view through the median portion of a plug valve incorporating my invention;

Fig. 2 is a fragmentary transverse sectional view thereof, taken through 2—2 of Fig. 1;

Fig. 3 is a fragmentary sectional view thereof, taken through 3—3 of Fig. 1, showing primarily the relation of the sleeves of the body and plug.

Fig. 4 is a fragmentary sectional view of the inside of the body showing the grooves in the wall of the plug recess; and, Fig. 5 is a fragmentary partial elevational and partial sectional view of the plug of my valve, showing grease conducting grooves and passages therein.

My plug valve, shown in the drawings, is provided with the usual valve body 1 and a rotatable plug 2. The body is provided with a longitudinal passage 1ª which is transversely intercepted by an enlarged recess 1ᵇ. This recess is frusto-conical in shape and is arranged to receive the main portion of the plug 2, which is also frusto-conical in shape. The plug has a transverse passage 2ª which, when the valve is open, is adapted to register with the passage 1ª.

Although I have provided a removable liner or sleeve, which may be applied to either the body or the plug, I have in the drawings shown both the body and the plug provided with such liners or sleeves. The claims appended hereafter are to be interpreted as covering one or both of such sleeves.

The sleeve mounted in the body is designated 3 and that carried by the plug is designated 4. The member upon which the sleeve 4 is mounted is herein referred to as the plug member. The sleeves 3 and 4 are provided at their diametrically opposite sides with ports 3ª and 4ª which register respectively with the passages 1ª and 2ª.

As shown in the drawings, the sleeve 3 is forced into and held in position by a cap 5 secured to the lower portion of the body of the valve by screws 6 in such a manner that the sleeve 3 will not rotate. The sleeve 4 is frictionally secured over the plug member 2, and the sleeve 4 is shown in the drawings as being forced into seating engagement with the interior of the sleeve 3 by an adjusting screw 7, located at the axial portion and large end of the plug. This screw 7 is secured by a lock nut 8, and the outer end may be covered by a cap 9.

Around the stem 2ᵇ of the plug may be provided a gland 10 which is shown as forcing a sealing packing 10ª between the stem 2ᵇ and the body.

A common form of providing lubrication between the seating or engaging surfaces between the plug and the body of the valve consists in forcing a suitable lubricant between the engaging surfaces of these members. The means shown consist of a grease fitting 11 for forcing grease into a chamber 1ᵍ at the small end of the recess of the body. The exterior of the plug, which is here shown as consisting of the sleeve 4, is provided with longitudinal grooves 4ᵇ for forcing the lubricant from the chamber 1ᵍ to the chamber 1ʰ at the large end of the recess. The grooves 4ᵇ are shown as connected by grooves 4ᶜ above and below the passage 2ª or the ports 4ª. Thus the engaging surfaces between the plug and body, which here are shown as the engaging surfaces between the sleeves 3 and 4, are lubricated to facilitate rotation of the plug for operating the valve.

I have discovered that an effective sealing and securing means between the sleeves and the respective carrying member may be formed by applying a film of normally semi-viscous material between the engaging surfaces. I have found that a lubricating grease provides a suitable material to perform this function. Either of the engaging surfaces are thoroughly covered with grease before the sleeves are forced either against the wall of the recess $1^b$ or around the plug member.

Such a film of grease rigidly holds the sleeve in position when the latter is under pressure, provides an effective seal against leak of the liquid passing through the valve, and also provides a suitable vehicle for forcing further grease between the sleeve and its carrying member to facilitate the removal of the sleeve.

To bring about such results I have provided grease conducting passages between the sleeves and their respective supporting or carrying members, means to supply grease thereto, and means for restricting or diverting the flow of grease.

The conducting passages consist essentially of grooves in the permanent members, which are the body and the plug.

The walls of the recess $1^b$ are provided with longitudinal grooves $1^c$ in which are provided suitable strips of packing 12. Further, to prevent bypass of grease past the packing, the wall of sleeve 3 may have opposed grooves $3^b$ to permit the packing to seat in both grooves $1^c$ and $3^b$.

The wall of the recess $1^b$ is also provided with annular grooves $1^d$ and $1^e$, which are intercepted by the grooves $1^c$ and the packing therein, thus dividing the grooves $1^d$ and $1^e$ into arcuate portions.

At the opposite and outer sides of the body are provided grease fittings 13, which may be Alemite or similar fittings. With these, grease under pressure may be supplied to the arcuate grooves $1^d$ and $1^e$ at the diametrically opposite sides of the body, which tends to be distributed between the wall of the recess $1^b$ and sleeve 3, and also tends to eject the sleeve from its socket. If desired, such grease fittings may be provided for grooves $1^d$ and $1^e$ as shown.

The grooves containing the packing 12 permit grease from the arcuate grooves to be conducted along the grooves $1^c$ toward the arcuate grooves at the opposite end of the plug recess.

Similarly the plug is provided with longitudinal grooves $2^c$ which are adapted to receive packing strips 14. The sleeve 4 may also have registering grooves $4^d$, whereby the packing strip may be placed in the opposed pairs of grooves.

The wall of the plug also has annular grooves $2^d$ and $2^e$ which are intercepted by the grooves $2^c$ and packing 14, dividing the same into arcuate grooves. Opposed arcuate portions are adapted to be supplied with grease by central transverse passages, those supplying grooves $2^d$ being designated $2^f$ and $2^g$, said passages being positioned at right angles to each other. These are in turn supplied with grease from a grease fitting 15 at the lower end of the plug, this fitting being accessible when the plug is removed. The groove $2^e$ may also be supplied by other transverse passages which may be connected to the passages $2^f$ and $2^g$.

The grooves $2^e$, in which the packing 14 is located, also permits grease to be conducted toward the opposite end of the plug, as stated in connection with the sleeve 3.

It will be noted that the packing strips in the longitudinal grooves may be eliminated with slightly different results. This will permit grease to be forced more freely to opposite sides of these grooves.

If no packing strips are employed, the grooves are preferably confined to the body and plug in order to avoid repeated machining of grooves in the replaceable sleeves.

Though I have shown and described a particular construction, combination, and arrangement of parts and portions, I do not wish to be limited to the same, but desire to include in the scope of my invention the construction, combination, and arrangement substantially as set forth in the appended claims.

1. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, and an axially removable frusto-conical sleeve in the recess of the body forming the seat for the plug, there being provided a film of normally semi-viscous material between the sleeve and the wall of the recess for tightly seating and sealing the sleeve within the body and to facilitate removal of the sleeve therefrom.

2. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, and an axially removable frusto-conical sleeve in the recess of the body forming the seat for the plug, there being provided a film of grease between the sleeve and the wall of the recess for tightly seating and sealing the sleeve within the body and to facilitate removal of the sleeve therefrom.

3. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, and an axially removable frusto-conical sleeve carried by the plug adapted to seat against the wall of the recess, there being provided a film of normally semi-viscous material between the sleeve and the plug member for tightly seating and sealing the sleeve around the latter and to facilitate the removal of the sleeve therefrom.

4. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, and an axially removable frusto-conical sleeve carried by the plug adapted to seat against the wall of the recess, there being provided a film of grease between the sleeve and the plug member for tightly seating and sealing the sleeve around the latter and to facilitate the removal of the sleeve therefrom.

5. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, an axially removable frusto-conical sleeve in the recess of the body forming the seat for the plug, there being provided a film of grease between the sleeve and the wall of the recess for tightly seating and sealing the sleeve within the body and to facilitate removal of the sleeve therefrom, the sleeve having ports at its diametrically opposite side registering with the passage in the body, there being provided grooves between the sleeve and the wall of the recess, and a grease fitting in the body for supplying grease under pressure to said grooves.

6. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, an axially removable frusto-conical sleeve carried by the plug adapted to seat against the wall of the recess, there being provided a film of grease between the sleeve and the plug member for tightly seating and sealing the sleeve around the latter and to facilitate the removal of the sleeve therefrom, said sleeve being provided at its diametrically opposite sides with ports registering with the passage in the plug member, there being provided grooves between the sleeve and the plug member, and a grease fitting at one end of the plug member for forcing grease into said grooves.

7. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, an axially removable frusto-conical sleeve in the recess of the body forming the seat for the plug, there being provided a film of grease between the sleeve and the wall of the recess for tightly seating and sealing the sleeve within the body and to facilitate removal of the sleeve therefrom, the sleeve having ports at its diametrically opposite sides registering with the passage in the body, there being provided longitudinal grooves between the wall of the recess and the sleeve, packing strips in said grooves, there being also provided arcuate grooves between the longitudinal grooves, and a grease fitting in the body for supplying grease under pressure to the arcuate grooves.

8. In a valve of the class described, a valve body having a fluid conducting passage therethrough and a frusto-conical recess larger than said passage and intercepting the same, a frusto-conical plug rotatably mounted in the recess, the plug having a transverse passage adapted to register with the passage in the body, an axially removable frusto-conical sleeve carried by the plug adapted to seat against the wall of the recess, there being provided a film of grease between the sleeve and the plug member for tightly seating and sealing the sleeve around the latter and to facilitate the removal of the sleeve therefrom, said sleeve being provided at its diametrically opposite sides with ports registering with the passage in the plug member, there being provided longitudinal grooves between the sleeves and the plug member, packing strips in the grooves, there being also provided arcuate grooves in the plug between the longitudinal grooves, and a grease fitting at one end of the plug member for forcing grease into the arcuate grooves.

JOHN R. DONALDSON.

REFERENCES CITED

The following references are of record in the file of this patent:

UNITED STATES PATENTS

| Number | Name | Date |
|---|---|---|
| 512,892 | Munger | Jan. 16, 1894 |
| 1,841,050 | O'Stroske | Jan. 12, 1932 |
| 2,081,431 | Hamer | May 25, 1937 |
| 2,271,137 | Hamer | Jan. 27, 1942 |